United States Patent Office 3,091,580
Patented May 28, 1963

3,091,580
CORROSION PROTECTION
Paul Shapiro, Chicago, and Lawrence V. Collings, Steger, Ill., assignors, by mesne assignments, to Sinclair Research, Inc., New York, N.Y., a corporation of Delaware
No Drawing. Filed July 30, 1958, Ser. No. 751,867
14 Claims. (Cl. 204—147)

This invention is concerned with the cathodic protection of a ferrous metal surface which is in contact with an aqueous corrosive medium. The method includes the use of a low electric current and of a corrosive medium having a small amount of zinc, cadmium or manganese ions. The method enables the current density of a cathodic protection system to be considerably reduced or even suspended for certain periods without undue corrosion of the metal. The method, therefore, effects considerable savings in the operating cost of a cathodic protection system.

Corrosion problems are particularly acute where large members, fabricated from ferrous metals, are in constant contact with an aqueous medium containing dissolved oxygen, or in contact with oxygen and moisture either intermittently or simultaneously. For example, sea water or salt water used as ballast in tankers, and the moisture in the soil around oil pipelines, are very active in the rusting of ferrous metals.

Conventional methods of protecting the tanks, pipelines and other steel surfaces include coating the metal with various compositions to prevent access of the corrosive medium and also the use of sacrificial anodes—usually magnesium rods—to take the brunt of the oxidative effects of the corrosive medium. In the aqueous media concerned, magnesium atoms, being more electropositive than iron, have a greater tendency to dissolve in the medium as positively charged magnesium ions, leaving electrons on the remaining Mg metal and surrounding the free metal with a solution rich in positively charged Mg ions. By attracting negative ions through the aqueous medium the positively charged region around the Mg rod is effectively an anode. The excess electrons left on the Mg rod itself are conducted, by a metallic lead, to the ferrous member which is to be protected. The dissolved oxygen and water, which react with each other according to the following equation when a supply of electrons is available:

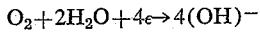

$$O_2 + 2H_2O + 4e^- \rightarrow 4(OH)^-$$

may secure these electrons from the supply conducted to the ferrous member, rather than from the iron itself by causing conversion of iron atoms to iron ions with consequent passage of these ions into solution and the familiar rusting, corrosion phenomenon. The excess electrons conducted to the ferrous member give this member a negative charge, making it a cathode and causing migration to the member of positive ions in the aqueous medium. Alternatively, in place of the galvanic couple created by the association of the magnesium, for example, with the iron-base metal, an electric current may be applied to the steel member to give the steel a constant negative charge to prevent rusting. A small minimum potential to a calomel electrode of −0.77 volt is usually required, with about −0.8 to −0.85 or −0.9 volt being usually used, whether the source of current is a sacrificial anode or another direct current source.

For protection of iron or steel against corrosion it has been established that the corrodible metal should be maintained at a potential or more negative than −0.77 volt with respect to a calomel electrode. Voltages more negative than about −0.9 could be used, but the expense has not been found to be justified. Since a calomel electrode, using a 1.0 N KCl salt bridge has a potential of −0.2805 with respect to a hydrogen electrode, the ferrous metal requires a standard minimum potential of about −0.49 volt. The effectiveness of any system for cathodic protection can be determined by measuring the current density in the circuit required to maintain the minimum −0.77 volt potential between the cathode and the calomel electrode of a standard reference cell. The current density, of course, is a measure of the energy put into the system, whether the mechanical energy of the generator or the chemical energy of the sacrificial anode. It can be regulated by adjusting the speed of the generator or the size of anodes. The expense of generating power is necessarily a costly one and, by increasing shipping charges, is reflected in the cost of products so shipped, e.g. petroleum products. The use of magnesium sacrificial anodes is even costlier, although more convenient. This invention provides a means whereby the cost of maintaining a charge on the corrodible metal, especially a steel transportation means, sufficient to prevent corrosion, may be drastically reduced.

As can be seen from Example A, in Table I below, a ferrous member in contact with sea water, a highly corrosive aqueous medium, requires that a minimum current, depending on the size of the ferrous member, be flowing in the solution in order for the ferrous member to be immune to attack by corrosive factors in the aqueous medium. As is known in the art (see U.S. Patent 2,200,469) the application of a high enough current density (at least about twice that shown in Example A for ordinary protection) to an iron or steel cathode in a sea water medium causes a dense calcium-magnesium compound coating to form on the cathode, which permits small interruptions of the current, apparently without corrosion of the iron or steel.

The process of this invention provides the aqueous corrosive medium with zinc, cadmium or manganese ions which enable the current requirement of the ordinary cathodic protection system to be drastically reduced, and which forms a protective coating on the corrodible metal without recourse to the use of more current. The coating can be sufficient to permit interruption of the current without undue corrosion of the metal.

The process of the invention comprises forming a coating on the metal to be protected by the imposition at least initially of a low direct electric potential in the range of 0.2–1.5 volts, a range ordinarily used for cathodic protection, on the metal while in contact with an aqueous corrosive medium having a small content, usually in the range of about 0.0005 to 0.1 normality, of zinc, cadmium or manganese ions or mixtures of two or three of these ions. The preferred normality range is about 0.001 to 0.01 N. The ions can be supplied by the addition to the corrosive medium of inorganic compounds or salts of these metals such as the strong mineral acid salts, chlorides, sulfates, etc. This potential supplies a current density of about 1–50 milliamps. per square foot of ferrous metal object to be protected, usually about 1–20 milliamps. per square foot.

It is theorized that the potential applied to the ferrous cathode causes at least incipient precipitation on the ferrous cathode of free zinc, cadmium or manganese, due to the migration of the positively charged ions of these elements to the ferrous member and their subsequent discharge due to the free electrons present thereon. The free metal may then react with the corrosive factors in the aqueous medium to form a protective film of zinc, cadmium or manganese hydroxide or carbonate. This theory is not to be considered as limiting the scope of this invention even though it has been found that at least initially the minimum potential required to be maintained between the anode and the cathode in solution is the minimum required to liberate the free metals: −0.76 volt in the case of zinc, −1.1 volts for manganese and −0.4 volt in the case of cadmium. After some metal is deposited the voltage may be below these values or the application of the current may be discontinued without undue harmful effects for at least a period of time.

In performing the process of this invention the electric potential may be supplied by any suitable direct current source which is sufficient to maintain an adequate current density, e.g. a direct current generator, a rectified A.C. generator, storage batteries or by a galvanic couple with magnesium or a more electropositive metal as the anode. The method of the invention may be used on metal which is already corroded, as will be seen.

A cathodic protection system can be tested for effectiveness by determining whether a sufficient potential exists on the corrodible metal in comparison to the solution potential of a standard electrode such as the calomel electrode discussed above. In the process of this invention, before a protective coating is established on the corrodible metal more amperage is required to maintain this difference in potential. As the coating is gradually established, less current is required, until a level state is reached. A diminution in current requirements is accomplished by a decrease in energy input demand by the generator or less deterioration of a sacrificial anode. The following examples are to be considered illustrative only and not limiting.

EXAMPLES

ASTM synthetic sea water provides a solution containing inorganic salts in proportions representative of ocean water. The process by which this water is made can be found on page 295 of the November 1957 Book of ASTM Standards on Petroleum Products and Lubricants. This standard synthetic seat water has a pH of 8.2 and contains:

| Compound | Gms./l. | Compound | Gms./l. |
|---|---|---|---|
| NaCl | 24.54 | $NaHCO_3$ | 0.20 |
| $MgCl_2 \cdot 6H_2O$ | 11.10 | KBr | 0.10 |
| $Na_2SO_4$ | 4.09 | $H_3BO_3$ | 0.03 |
| $CaCl_2$ | 1.16 | $SrCl_2 \cdot 6H_2O$ | 0.04 |
| KCl | 0.69 | NaF | 0.003 |

Natural sea water, according to "The Oceans," by Sverdaup, Johnson and Fleming, contains Mg, Ca, Mn and Zn in the following average concentrations:

| Element or ion | p.p.m. | Milligram atoms per liter | Milliequivalents Per Liter | Normality |
|---|---|---|---|---|
| Magnesium | 1,270 | 53.6 | 107.1 | 0..107 |
| Calcium | 400 | 10.2 | 20.5 | 0.02 |
| Manganese | 0.001–0.01 | $0.2$–$0.2 \times 10^{-4}$ | $0.04$–$4.0 \times 10^{-4}$ | $0.04 \times 10^{-7}$ to $4.0 \times 10^{-7}$ |
| Zinc | 0.005 | $0.8 \times 10^{-4}$ | $1.6 \times 10^{-4}$ | $1.6 \times 10^{-7}$ |

The amount of cadmium naturally present in sea water is not given in this book, presumably because the quantity is too small to be detected.

To a sample of synthetic sea water was added enough cadmium chloride to make the solution of 0.01 normal with respect to $CdCl_2$. The resulting solution was placed in a 4-liter beaker which contained a steel coupon for a cathode and a graphite anode. Current was supplied by a filtered D.C. power supply. Current was controlled by 5,000 ohm variable resistors. In order to prevent concentration or pH changes due to evaporation, electrolysis, etc., the beaker was equipped with a reservoir and syphon arrangement to constantly supply fresh solution. Atmospheric temperature and pressure conditions prevailed throughout. The electric potential on the steel coupon was determined by a calomel electrode connected to the coupon through leads and a millivolt meter and to the solution by a saturated KCl salt bridge.

During the first day of exposure to the steel coupon to this solution, a current density of 5.2 milliamps. per square foot was required to maintain cathodic protection, i.e. a voltage of −0.8 to −0.85. By the third day only 2.4 milliamps./ft.² were needed and by the fifth day a current density of 1.6 milliamps./ft.² on the cathode was required to maintain −0.8 to −0.85 volt potential to the calomel electrode. By the seventh day the current density requirement had levelled off to 1.4 milliamps./ft.². After 8.3 days under cathodic protection the steel coupon was removed from the apparatus and placed in a beaker which contained the ASTM sea water with no further additives or electrodes. After 42 days in this beaker only a little rust was evident, at the lower edge of the coupon. This cadmium chloride solution is reported in Table I below as solution "B." Similar experiments were conducted with steel coupons in solutions containing $CdCl_2$ in other concentrations and solutions containing $ZnCl_2$ in various concentrations. A test was also conducted, for comparison purposes, with a steel coupon in a sample of the synthetic sea water which contained no other additives. Tests F and G, reported in Table I, below, were performed upon a steel coupon which was already rusted on about 95% of its surface.

Tests were also conducted upon sea water samples containing zinc and manganese salts in another apparatus wherein a magnesium rod 6¼″ long and ½″ in diameter was used as the anode and source of current. This apparatus had the same electric and solution concentration controls as the other apparatus. Tests H, J, K and L were conducted in this apparatus.

Table I

| Test solution | Days protected | Current density (ma./ft.²) | Percent savings over blank | Cumulative savings, percent |
|---|---|---|---|---|
| A (blank) | 1 | 16.2 | | |
|  | 3 | 10.7 | | |
|  | 5 | 9.0 | | |
|  | 7 | 8.3 | | |
| B (0.01 N $CdCl_2$) | 1 | 5.2 | 68.0 | |
|  | 3 | 2.4 | 77.5 | |
|  | 5 | 1.6 | 82.0 | |
|  | 7 | 1.4 | 83.1 | 77.4 |
| C (0.01 N $ZnCl_2$) | 1 | 4.0 | 75.3 | |
|  | 3 | 1.6 | 85.0 | |
|  | 5 | 0.7 | 92.0 | |
|  | 7 | 0.4 | 95.1 | 86.9 |
| D (0.001 N $CdCl_2$) | 1 | 14.0 | 13.6 | |
|  | 3 | 9.8 | 8.4 | |
|  | 5 | 7.4 | 17.8 | |
|  | 7 | 6.7 | 19.3 | 14.8 |
| E (0.001 N $ZnCl_2$) | 1 | 11.6 | 28.4 | |
|  | 3 | 5.6 | 47.6 | |
|  | 5 | 1.8 | 80.2 | |
|  | 7 | 1.4 | 83.3 | 54.9 |
| F (blank) | 1 | 14.0 | | |
|  | 3 | 10.6 | | |
|  | 5 | 9.6 | | |
|  | 7 | 8.8 | | |
|  | 10 | 8.6 | | |
| G (0.001 N $ZnCl_2$) | 1 | 10.2 | 27.1 | |
|  | 3 | 7.6 | 28.3 | |
|  | 5 | 6.2 | 35.4 | 30.3 |
|  | 7 | 5.4 | 38.6 | |
|  | 10 | 4.6 | 46.5 | 35.2 |
| H (blank) | 1 | 12.4 | | |
|  | 3 | 11.8 | | |
|  | 5 | 11.0 | | |
|  | 7 | 10.2 | | |
|  | 10 | 8.8 | | |
| J (0.001 N $ZnCl_2$) | 1 | 8.4 | 32.3 | |
|  | 3 | 7.5 | 36.4 | |
|  | 5 | 7.0 | 36.3 | 35.0 |
|  | 7 | 6.2 | 39.2 | |
|  | 10 | 4.4 | 50.0 | 38.9 |
| K (0.001 N $MnCl_2$) | 1 | 8.8 | 29.0 | |
|  | 3 | 6.0 | 49.2 | |
|  | 5 | 4.1 | 62.7 | 47.0 |
|  | 7 | 2.6 | 74.5 | |
|  | 10 | 1.4 | 84.0 | 59.0 |
| L (0.001 N $MnSO_4 \cdot H_2O$) | 1 | 10.8 | 13.1 | |
|  | 3 | 5.1 | 56.7 | |
|  | 5 | 3.3 | 70.0 | 46.6 |
|  | 7 | 2.6 | 74.5 | |
|  | 10 | 2.4 | 72.7 | 57.4 |

The following is a description of a test used to determine the effectiveness of the addition of Zn and Mn salts to effect a reduction in current demand for cathodically protected steel surfaces buried in soil.

A steel pipe anode was buried to a depth of 4 feet at the center of a 30-feet diameter circle. The pipe was surrounded with a coke breeze backfill. The anode was then connected to 18 cathodes buried at 5-foot intervals around the periphery of the circle. Cathodes were made from 4" x 9" cleaned steel plate. Lead wires were attached to the cathodes by the Cadweld (thermite) process. The joints were coated with "Roskote" to prevent the danger of galvanic corrosion by the bronze of the weld. The cathodes were buried 4 feet below the surface with major surfaces parallel to radii of the circle. The test cathodes were below the water table.

The cathodes were placed in burlap bags which were each filled with 15 lbs. of dried topsoil. To this topsoil the chemicals were added. The bags were then placed in their respective holes and tamped into place. Enough water was present in each instance to cover the cathode and to assist in obtaining well packed backfill. The four blanks consisted of cathodes in burlap bags containing 15 lbs. of topsoil without any chemical added. Current was supplied by a constant voltage D.C. power supply. Readings were taken with a Miller multicombination meter. The soil resistivity, taken with a Megger instrument, was 1875 ohms./cm.$^3$ and the pipe to soil potential was approximately −1.18 v. to a Cu/CuSo$_4$ electrode.

in preventing the corrosion of iron is due to the reversal of its oxidation potential and the plating out of a highly resistant film of atomic hydrogen on the charged surface of the iron. Any inorganic coating that is formed on this film due to precipitation of chemicals naturally present in the electrolyte (e.g. the formation of calcareous coatings in sea water) will serve as a barrier to any corrosive elements that might tend to remove this film, e.g. O$_2$.

These coatings have an additional advantage in that they are anodic (less noble than iron) and will form a galvanic couple which will provide additional protection due to the current set up between the two metals. Also, in the event of interruption of current, or under small current conditions, these metals can act as anodes and thereby protect the steel.

The products that are formed due to the corrosion of the above-mentioned metals will result in insoluble adherent precipitates when the current is interrupted or diminished. For example, the zinc ion that is formed as a result of its oxidation reacts with the hydroxyl ion at the cathode forming Zn(OH)$_2$ which is very insoluble in aqueous media. The CO$_2$ normally present in aerated water will alter the hydroxide to the basic or other carbonate. This is also insoluble.

In the practice of the method of this invention, it will

| Test No. | Chemical added | Concentration in 15 lbs. of soil ||| Current density, milliamps/sq. ft. |||||||
|---|---|---|---|---|---|---|---|---|---|---|
| | | Weight, grams | Percent | Moles cation | Week No. 1[1] | Percent savings | Week No. 2[1] | Percent savings | Week No. 3[1] | Percent savings |
| M[2] | Blank | | | | 2.91 | | 3.14 | | 2.63 | |
| N | ZnCl$_2$ | 6.8 | 0.1 | 0.05 | 2.70 | 7.20 | 2.64 | 15.8 | 2.13 | 19.0 |
| O | ZnCl$_2$ | 22.5 | 0.33 | 0.165 | 3.13 | −7.60 | 2.14 | 31.9 | 1.75 | 37.3 |
| P | ZnCl$_2$ | 68.0 | 1.00 | 0.50 | 2.68 | 7.10 | 1.58 | 49.6 | 1.30 | 50.6 |
| Q | MnSO$_4$·H$_2$O | 8.45 | 0.12 | 0.05 | 2.32 | 20.3 | 2.86 | 8.9 | 2.27 | 15.9 |
| R | MnSO$_4$·H$_2$O | 27.9 | 0.41 | 0.165 | 2.61 | 10.3 | 2.46 | 21.6 | 1.45 | 44.8 |
| S | MnSO$_4$·H$_2$O | 84.5 | 1.24 | 0.5 | 2.85 | 2.03 | 2.36 | 24.8 | 1.52 | 42.2 |
| T | CdCl$_2$ | 9.04 | 0.13 | 0.05 | 3.17 | −5.05 | 2.60 | 17.2 | 2.18 | 17.2 |

[1] Each week represents an average of readings taken 4 to 5 times a week.
[2] This an average value for 4 blanks.

The soil resistivity indicates that the test soil used here is not very corrosive. Since very little current density is required for protection, the effectiveness of the salts do not manifest themselves rapidly. However, in low-resistant soils, e.g. 300 ohms/cm.$^3$ more current would be required and the effectiveness of the salts would appear in more rapid time.

It has been found that any zinc, cadmium or manganese salts which contain these metals in cationic form and which are at least somewhat water-soluble can be used in performing this process. The halides and sulfates are usually cheap and suitable. The quantity of salt needed depends, of course, on the surface area to be covered and the type of material to be protected against corrosion as well as on thickness of the coating desired. A solution having a normality of at least about 0.0005 is usually required for the treatment of steel. A normality of about 0.001 to 0.01 is preferred, while economic considerations would dictate an upper limit of about 0.1 N. The coating thickness, of course, determines the length of the period of time during which the electric potential may be interrupted without harmful effects on the metal.

For example, a satisfactory film of Zn on the steel would be one about 0.1 mil in thickness. This would be 65 lbs. of ZnCl$_2$/mile of 6-inch pipe that would be necessary. However, not all the ZnCl$_2$ would drain through the ground and reach the pipe. An excess amount, say at least about 500 to 650 lbs. ZnCl$_2$/mile of 6-inch pipe (about 0.08 lb./sq. ft. of pipe surface for 650 lbs.) would insure the chances of obtaining a 0.1 mil coating.

It is hypothesized that the reason a direct current applied to the iron surface in an aqueous medium is effective be obvious to one skilled in the art that no apparatus beyond that now normally used for cathodic protection is required since this apparatus can create a potential difference between anode and cathode in the required range of about 0.2 to 1.5 volts. Due to the discovery that the salts of zinc, cadmium and manganese are very effective in reducing current demand for systems under cathodic protection in sea water, the liquid environment of the corrodible metal can be made 0.01 N in CdCl$_2$ for instance, and give a 68% current reduction after one day of operation. After sufficient film formation, 83.1% current savings have been encountered. After sufficient time for film formation 0.01 N ZnCl$_2$ resulted in a current saving of 95% and 0.001 N ZnCl$_2$, 83.3%. The salts of manganese gave current reductions of 75% after adequate time was allowed for film formation. In addition, glucose or other additive agents which improve the coating quality can be added to the corrosive liquid.

The method of this invention merely requires the addition of cheap salts in very low concentrations to the corrosive aqueous medium involved in existing rectifier or magnesium anode cathodic protection systems, whether or not the corrosive medium is contained in soil or other material contacting the corrodible metal.

We claim:

1. In a system for cathodic protection where a ferrous metal object is made a cathode and exposed to an electrically conductive corrosive aqueous medium, the improvement which comprises adding to the corrosive aqueous medium a water-soluble salt of a metal selected from the group consisting of zinc, cadmium, manganese and mixtures of the same sufficient to make the medium at least about 0.0005 normal in the ion of said selected metal and impressing an electric current on the medium between anode and cathode, said current having a current density of about 1 to 50 milliamps. per square foot of ferrous metal surface to be protected, and a potential of about 0.2 to 1.5 volts between the anode and cathode to protect cathodically said ferrous metal against corrosion and being at least initially the minimum electric current required to liberate free metal from said salt.

2. The method of claim 1 in which the aqueous medium is about 0.01 to 0.001 N in the said ions.

3. The method of claim 1 where the ferrous metal object is maintained in contact with the corrosive liquid after the minimum potential is removed.

4. The method of claim 1 where the potential is supplied by a magnesium anode immersed in the said corrosive liquid.

5. The method of claim 1 where the ion is zinc and the potential is greater than 0.76 volt.

6. The method of claim 1 where the ion is cadmium, and the potential is greater than 0.4 volt.

7. The method of claim 1 where the ion is manganese and the potential is greater than 1.1 volts.

8. The method of claim 1 in which the aqueous medium is water containing sodium chloride.

9. The method of claim 1 in which the electric current has a current density of about 1–20 ma./sq. ft.

10. The method of claim 9 in which the aqueous medium is water containing sodium chloride.

11. The method of claim 1 in which the compound of the selected metal is the chloride.

12. The method of claim 11 in which the aqueous medium is water containing sodium chloride.

13. The method of claim 11 in which the compound is zinc chloride and the potential is greater than 0.76 volt.

14. The method of claim 12 in which the compound is zinc chloride and the potential is greater than 0.76 volt.

References Cited in the file of this patent
UNITED STATES PATENTS

| | | |
|---|---|---|
| 1,972,835 | Tainton | Sept. 4, 1934 |
| 2,126,430 | Unger | Aug. 9, 1938 |
| 2,200,469 | Cox | May 14, 1940 |
| 2,444,174 | Tarr et al. | June 29, 1948 |
| 2,601,214 | Robinson | June 17, 1952 |
| 2,687,993 | Cox | Aug. 31, 1954 |
| 2,839,462 | Nelson | June 17, 1958 |

FOREIGN PATENTS

| | | |
|---|---|---|
| 377,226 | Great Britain | July 22, 1932 |

OTHER REFERENCES

Humble Corrosion, vol. 4, No. 7, July 1948, pages 358–370.